(12) United States Patent
Kim et al.

(10) Patent No.: US 6,906,284 B2
(45) Date of Patent: Jun. 14, 2005

(54) ARC WELDING METHOD

(76) Inventors: You-Chul Kim, 3-19-7, Minamisuita, Suila, 564-0043 Osaka (JP); Peter Orszagh, Karlova Ves 45, Bratislava 84104 (SK)

(*) Notice: Subject to any disclaimer, the term of this patent is extended or adjusted under 35 U.S.C. 154(b) by 108 days.

(21) Appl. No.: 10/625,537

(22) Filed: Jul. 24, 2003

(65) Prior Publication Data

US 2004/0262280 A1 Dec. 30, 2004

Related U.S. Application Data

(63) Continuation-in-part of application No. 09/869,018, filed as application No. PCT/JP98/05923 on Dec. 24, 1998.

(51) Int. Cl.⁷ ............................................ B23K 9/10
(52) U.S. Cl. ....................... 219/130.21; 219/130.33; 219/137 PS
(58) Field of Search ................ 219/130.21, 130.31, 219/130.32, 130.33, 130.51, 137 PS

(56) References Cited

U.S. PATENT DOCUMENTS

| 3,792,225 A | 2/1974 | Needham et al. |
| 5,834,732 A | * 11/1998 | Innami et al. ......... 219/130.31 |
| 6,087,626 A | 7/2000 | Hutchison et al. |

FOREIGN PATENT DOCUMENTS

| JP | 59 202176 A | 11/1984 |
| JP | 59 199173 A | 12/1984 |
| JP | 08 229680 A | 9/1996 |
| JP | WO 38870 | 7/2000 |

OTHER PUBLICATIONS

PCT International Search Report (PCT/JP98/05923).

\* cited by examiner

Primary Examiner—Clifford C. Shaw
(74) Attorney, Agent, or Firm—Finnegan, Henderson, Farabow, Garrett & Dunner, LLP

(57) ABSTRACT

The present invention relates to an arc welding method in which generation of spatters can be suppressed while the use quantity of gas to be supplied to a welding portion can be decreased. A welding wire 8 is brought into contact with a work W while applying a voltage between the welding wire 8 and the work W, so that the end of the welding wire 8 is caused to be fixingly welded to the work W. At this time, an electric resistance between the welding wire 8 and the work W is continuously obtained during the contact between the welding wire 8 and the work W, and thus, a minimum of the electric resistance is detected. When the current is temporarily reduced after the detection of the minimum of the electric resistance, the tip of the welding wire 8 hardly bursts, thus suppressing the expelling of molten particles, which may cause spatters, from the welding wire 8. The minimum value is also used for the torch-to-workpiece distance control.

12 Claims, 9 Drawing Sheets

ARC WELDING METHOD

RELATED APPLICATION

This application is a continuation-in-part of prior application Ser. No. 09/869,018, filed Oct. 29, 2001, now abandoned which is a national phase entry under 35 U.S.C. § 371 from International Application No. PCT/JP98/05923, filed Dec. 24, 1998, in the European Patent Office, the contents of both of which are relied upon and incorporated herein by reference.

TECHNICAL FIELD

The present invention relates to a welding method and, more particularly, to an arc welding method in which a welding wire is used.

BACKGROUND ART

An arc welding method has been known as a method for subjecting a metallic work to welding. In this welding method, a welding wire is brought into contact with the work with application of a voltage between the welding wire and the work, so that the tip of the welding wire, which is fused by the energization at that time, is fixingly welded to the work. Thereafter, the welding wire is separated from the work in the state in which the tip of the welding wire is fused. And then, the welding wire is allowed to face a next welding portion on the work, and thus, sequentially subjects the next welding portion to similar welding.

Since in the above-described arc welding method, the voltage is continuously applied to the welding wire during a series of welding processes, the tip of the welding wire may burst at the instant when the welding wire is separated from the work. The bursting tip of the welding wire comes into molten particles, which are then expelled over the work. As a result, there is a danger that spatters generated on the work degrade the appearance or finished quality of the welding portion and its surroundings.

It has been known that supplying various kinds of gases such as carbonic acid gas and mixed gas of carbonic acid gas and argon gas to the welding portion is normally effective in suppressing the above-described generation of the spatters. However, use of such gas induces an increase in welding cost, and further, the use quantity will be possibly restricted in the future from the viewpoint of environmental protection according to the kind of used gas.

An object of the present invention is a new control method to keep the welding torch height constant and to suppress generation of spatters.

DISCLOSURE OF THE INVENTION

An arc welding method according to the present invention is a method for subjecting a work to welding by the use of a welding wire. This arc welding method comprises the steps of: bringing the welding wire into contact with the work while applying a voltage between the welding wire and the work, thereby causing the end of the welding wire to be fixingly welded to the work; obtaining an electric resistance between the welding wire and the work during the contact between the welding wire and the work, so as to detect a minimum of the electric resistance; and significantly reducing the welding current by stopping the application of the voltage between the welding wire and the work after the detection of the minimum of the electric resistance.

For example, a voltage value and a current value between the welding wire and the work are measured, and thus, the electric resistance between the welding wire and the work is obtained based on the voltage value and the current value.

Furthermore, the current is temporarily reduced when, for example, a predetermined time is elapsed after the above-described minimum of the electric resistance is detected. The predetermined time here signifies, for example, a time required such that the electric resistance between the welding wire and the work reaches an electric resistance obtained by adding an electric resistance of 10% or more and 98% or less of a difference between a previously obtained maximum of the electric resistance between the welding wire and the work and the above-described minimum to the above-described minimum. Otherwise, the predetermined time is, for example, 0.5 ms.

Alternatively, the current is temporarily reduced when, for example, the electric resistance between the welding wire and the work is increased up to a predetermined electric resistance after the above-described minimum of the electric resistance is detected. The predetermined electric resistance here signifies, for example, an electric resistance obtained by adding an electric resistance of 10% or more and 98% or less of a difference between a previously obtained maximum of the electric resistance between the welding wire and the work and the above-described minimum to the above-described minimum.

Incidentally, the time when the current is temporarily reduced is, for example, 0.25 ms.

In the above-described arc welding method according to the present invention, the end of the welding wire to be fixingly welded to the work performs the required welding with respect to the work. In this welding procedure, when the current is temporarily reduced after the minimum electric resistance between the welding wire and the work is detected, the welding wire hardly bursts at the tip thereof. As a result, molten particles are hardly expelled from the welding wire over the work, thereby effectively suppressing generation of spatters on the work.

Moreover, an arc welding device according to the present invention is a device for subjecting a work to welding by the use of a welding wire. This arc welding device comprises: means for applying a voltage between the welding wire and the work; means for moving the welding wire in such a manner as to bring it into contact with the work, means for obtaining an electric resistance between the welding wire and the work during the contact between the welding wire and the work, so as to detect a minimum of the electric resistance; and means for temporarily reducing the current after the detection of the minimum of the electric resistance.

In the above-described arc welding device according to the present invention, the welding wire is moved to be brought into contact with the work. As a result, the welding wire is fused by the voltage applied between the welding wire and the work, so that the work is subjected to the required welding. When the current is temporarily reduced after the minimum electric resistance is detected during the contact between the welding wire and the work, the welding wire hardly bursts at the tip thereof. As a result, molten particles are hardly expelled from the welding wire over the work, thereby effectively suppressing generation of spatters on the work.

Other objects and effects of the present invention will be obvious from the detailed description given below.

DETAILED DESCRIPTION OF THE INVENTION

Figure 1:
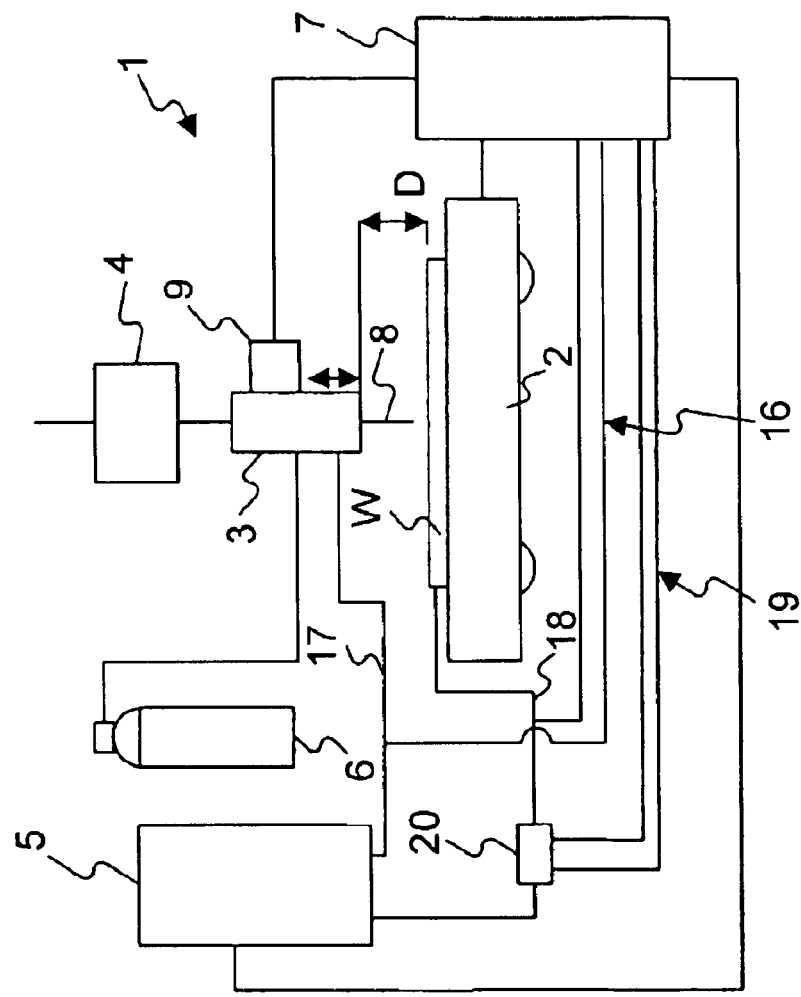
FIG. 1 is a schematic view showing a gas-metal arc welding device in a preferred embodiment according to the present invention.

Referring to FIG. 1, a description will be given of a welding device which carries out a gas-metal arc welding method in a preferred embodiment according to the present invention. In FIG. 1, a gas-metal arc welding device 1 comprises mainly a carrier 2, a torch 3, a wire feeder 4, a power source 5, a shielding gas cylinder 6 and a controller 7.

The carrier 2 is adapted to mount thereon a work W to be welded, and it is configured in such a manner as to be moved in FIG. 1 by a moving device, not shown.

The torch 3 is disposed above the carrier 2, and holds therein a welding wire 8 for subjecting the work W to welding. The welding wire 8 held by the torch 3 extends downward in FIG. 1, i.e., toward the carrier 2, to thus face the work W mounted on the carrier 2. Here, the welding wire 8 is a metallic wire for welding, which is commercially available.

The above-described torch 3 is provided with a motor 9. The motor 9 serves to move the torch 3 in a vertical direction. Specifically, the motor 9 is configured such that the torch 3 is moved downward when the motor 9 is rotated forward, whereas the torch 3 is moved upward when the motor 9 is rotated reversely.

Furthermore, the torch 3 is provided with a gas jetting port, not shown, in the vicinity of an outlet for the welding wire 8 extending toward the work W. The gas jetting port is configured such that shielding gas can be jetted in such a manner as to envelop the welding wire 8 projecting from the torch 3 and can be sprayed toward the work W.

The wire feeder 4 is adapted to feed the welding wire 8 toward the torch 3.

The power source 5 is used to apply a voltage between the work W mounted on the carrier 2 and the welding wire 8 held by the torch 3. A positive electrode of the power source 5 is connected to the welding wire 8 via the torch 3, and a negative electrode thereof is connected to the work W. Here, a power source of a type which can change the output current by, for example, electronic control is used as the power source 5.

The shielding gas cylinder 6 is connected to the torch 3, thereby supplying the shielding gas which is jetted from the gas jetting port of the torch 3.

Figure 2:
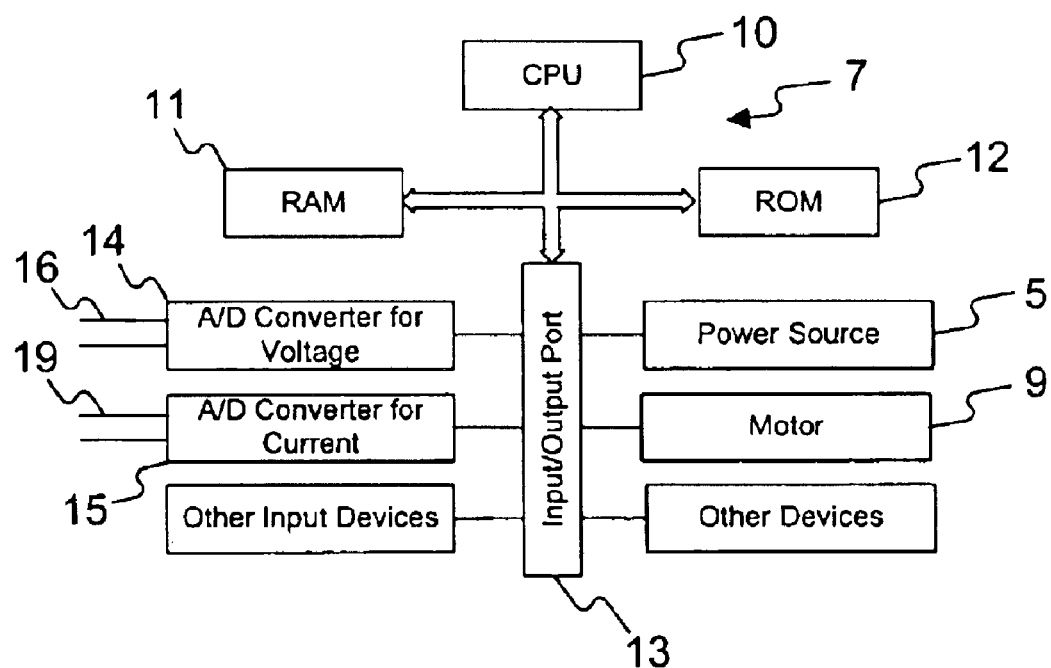
FIG. 2 is a diagram illustrating the schematic configuration of a controller for use in the gas-metal arc welding device.
Figure 3:
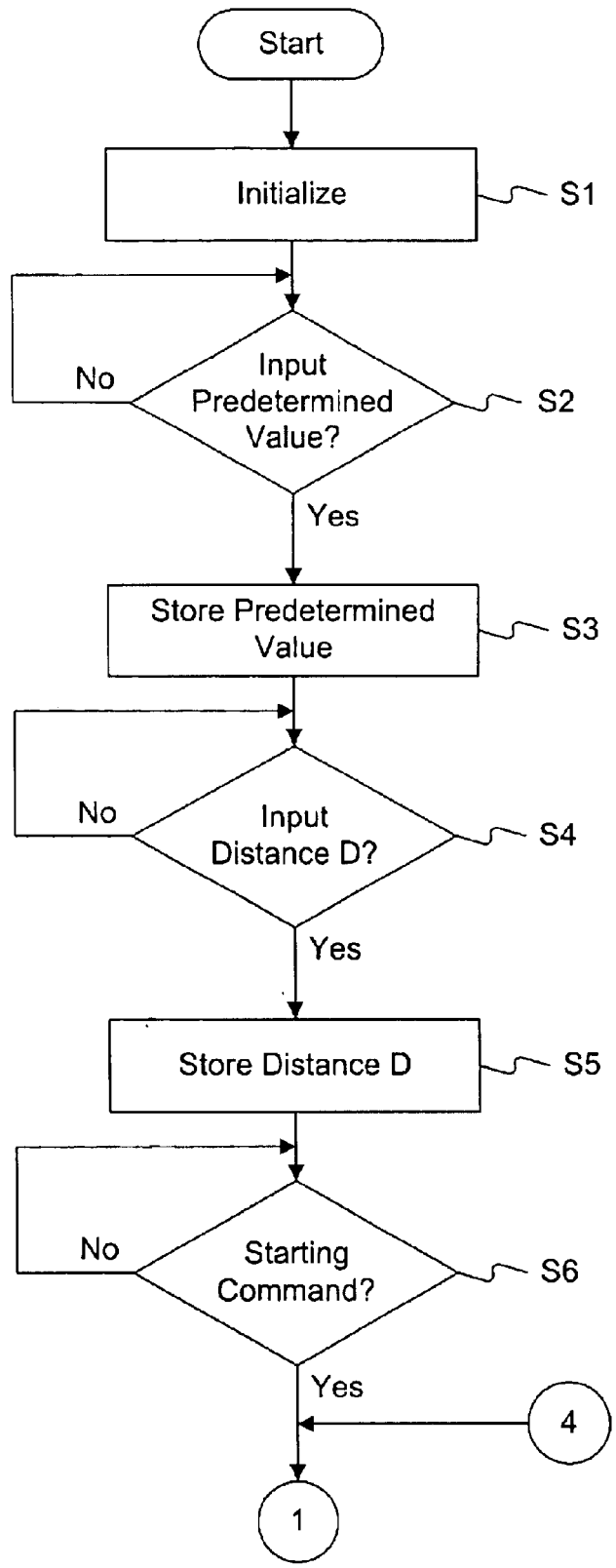
FIG. 3 is part of a flowchart illustrating the control of the gas-metal arc welding device.
Figure 4:
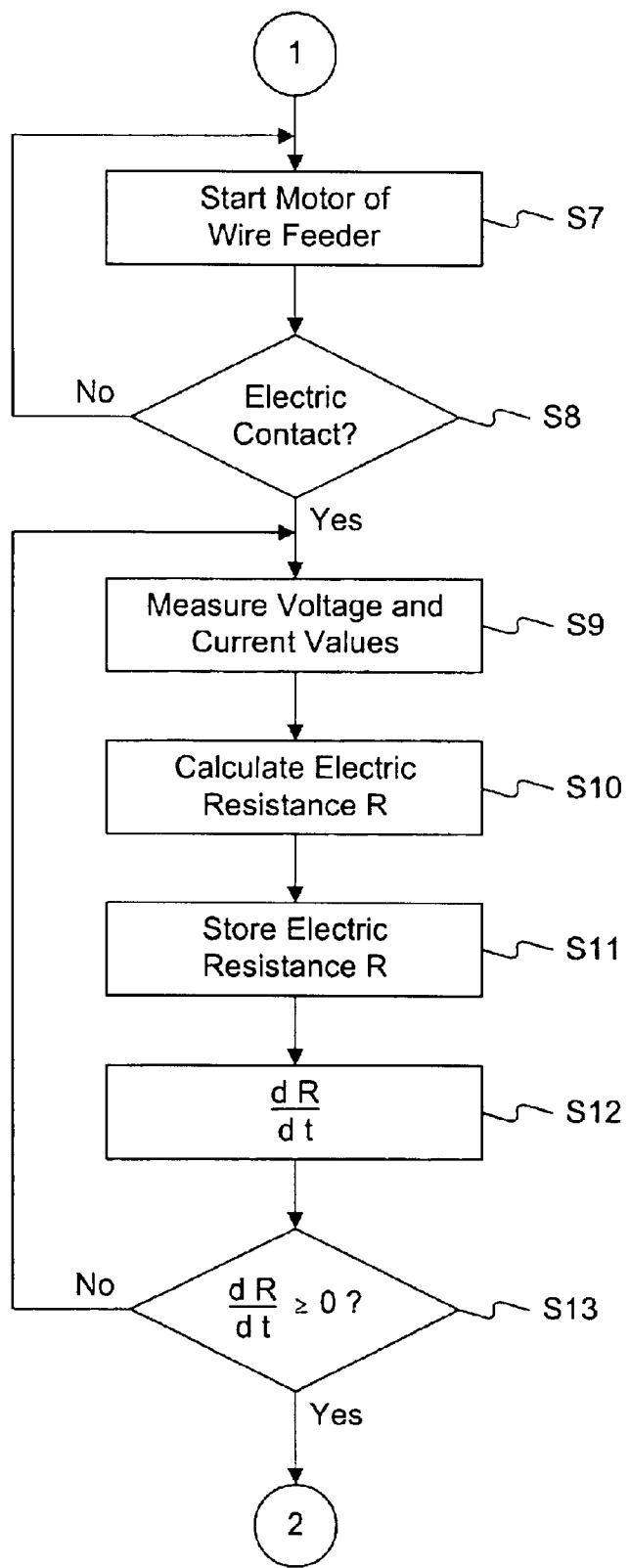
FIG. 4 is part of a flowchart illustrating the control of the gas-metal arc welding device.
Figure 5:
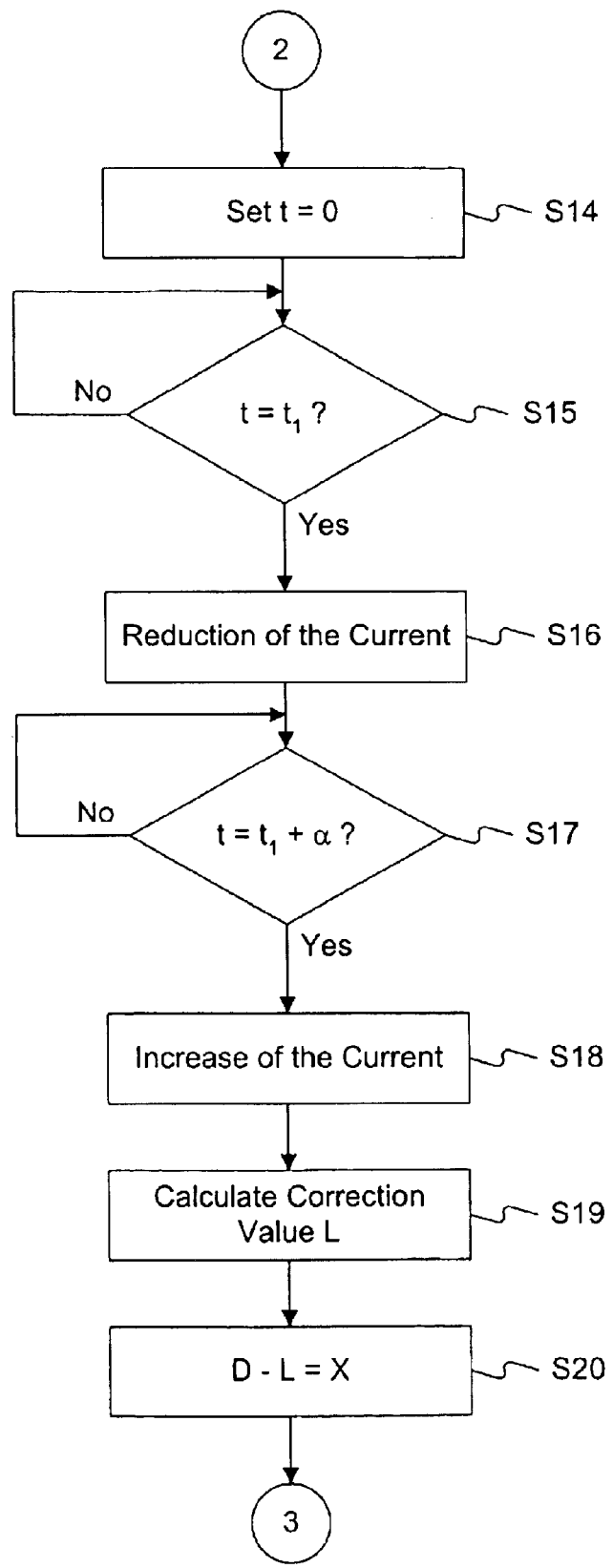
FIG. 5 is part of a flowchart illustrating the control of the gas-metal arc welding device.
Figure 6:
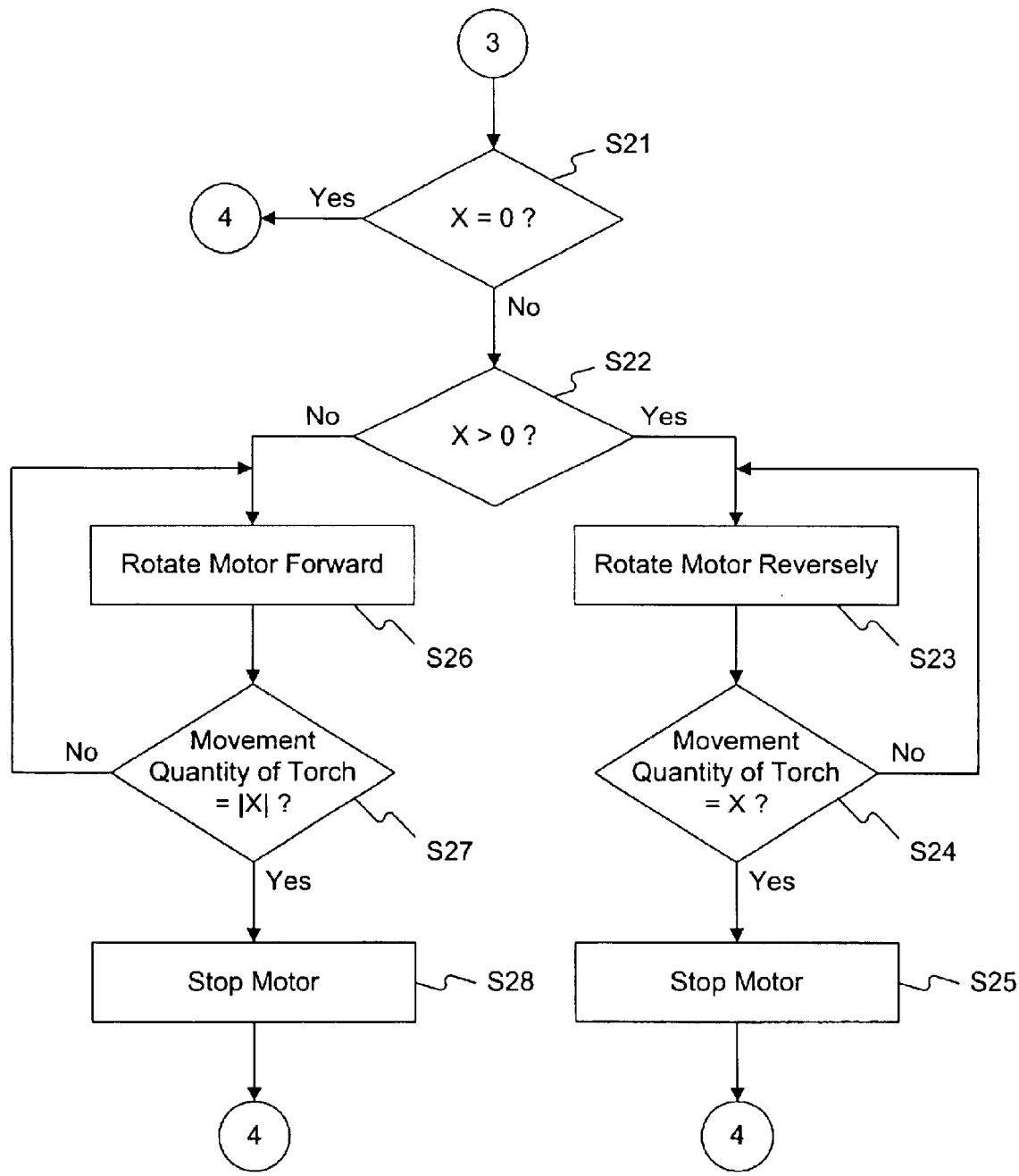
FIG. 6 is part of a flowchart illustrating the control of the gas-metal arc welding device.

The controller 7 controls operation of the gas-metal arc welding device 1. As illustrated in FIG. 2, the controller 7 comprises a central processing unit (CPU) 10 governing the control, a random access memory (RAM) 11 for storing various kinds of data therein, a read-only memory (ROM) 12 in which a control program is recorded, and an input/output port 13. To the input of the input/output port 13 are connected not only an A/D converter 14 for a voltage and an A/D converter 15 for a current but also other input devices such as a keyboard by which an operator inputs predetermined information or processing commands or the like. In contrast, to the output of the input/output port 13 are connected the power source 5, the motor 9 and the other devices such as the wire feeder 4 and the carrier 2.

The A/D converter 14 for a voltage is connected to a voltage measuring circuit 16 (see FIG. 1) for measuring a voltage value when the welding wire 8 and the work W are electrically conducted to each other. The voltage measuring circuit 16 is connected at one end thereof to a power source circuit 17 for connecting the power source 5 to the torch 3 and at the other end thereof to another power source circuit 18 for connecting the work W to the power source 5. In consequence, the voltage measuring circuit 16 is connected in parallel to a series of power source circuits consisting of the power source circuits 17 and 18.

In contrast, the A/D converter 15 for a current is connected to a current measuring circuit 19 (see FIG. 1) for measuring a current when the welding wire 8 and the work W are electrically conducted to each other. The current measuring circuit 19 is branched from a shunt resistance 20 disposed in either of the power source circuits 17, 18. Consequently, the current measuring circuit 19 is connected in series to the power source circuit 17 or 18.

Next, explanation will be made on an arc welding method in which the gas-metal arc welding device 1 is used. Here, welding operation by the above-described gas-metal arc welding device 1 will be explained in reference to control flowcharts illustrated in FIGS. 3 to 6.

When an operator turns on the power source of the gas-metal arc welding device 1, initialization is first performed in step S1 in accordance with a control program such that the carrier 2 is set at an initial position, the power source 5 is operated or the like. At this time, shielding gas is started to be supplied from the carbonic acid gas cylinder 6 to the torch 3.

Subsequently, in step S2, the operator is expected to input a predetermined value in accordance with the program. Here, the predetermined value signifies the cross-sectional area S or material constant C of the welding wire 8. Incidentally, the material constant C is a constant inherent to a metallic material constituting the welding wire 8. When the operator inputs a required predeternimied value, the control routine proceeds from step S2 to step S3 in accordance with the program, and then, various kinds of input predetermined values are stored in the RAM 11.

After step S3, the operator is expected to input an optimum distance D (see FIG. 1) between the welding torch 3 and a portion to be welded on the work W in step S4 in accordance with the program. The optimum distance D depends on the type of the welding wire 8 or the work W, and therefore, it can be appropriately set by the operator. When the operator inputs the optimum distance D, the optimum distance D is stored in the RAM 11 in step S5.

Next, in step S6, the operator is expected to input a welding starting command in accordance with the program. When the operator inputs the welding starting command, the control routine proceeds to step S7 in accordance with the program, and then, the wire feeder motor is started. Consequently, the welding wire 8 is moved downward in FIG. 1, i.e., toward the work W. When the tip of the welding wire 8 is in contact with the portion to be welded on the work W, the welding wire 8 is electrically conducted to the work W. In accordance with the program, the conducted state is confirmed in step S8 in response to an electric signal generated by the electric conduction, and further, the wire feeder motor is stopped. Thereafter, the control routine proceeds to step S9.

When the welding wire 8 and the work W are electrically conducted to each other in contact in the above-described manner, the current supplied from the power source 5 flows from the welding wire 8 to the work W, so that the portion to be welded on the work W is subjected to welding.

Figure 7:
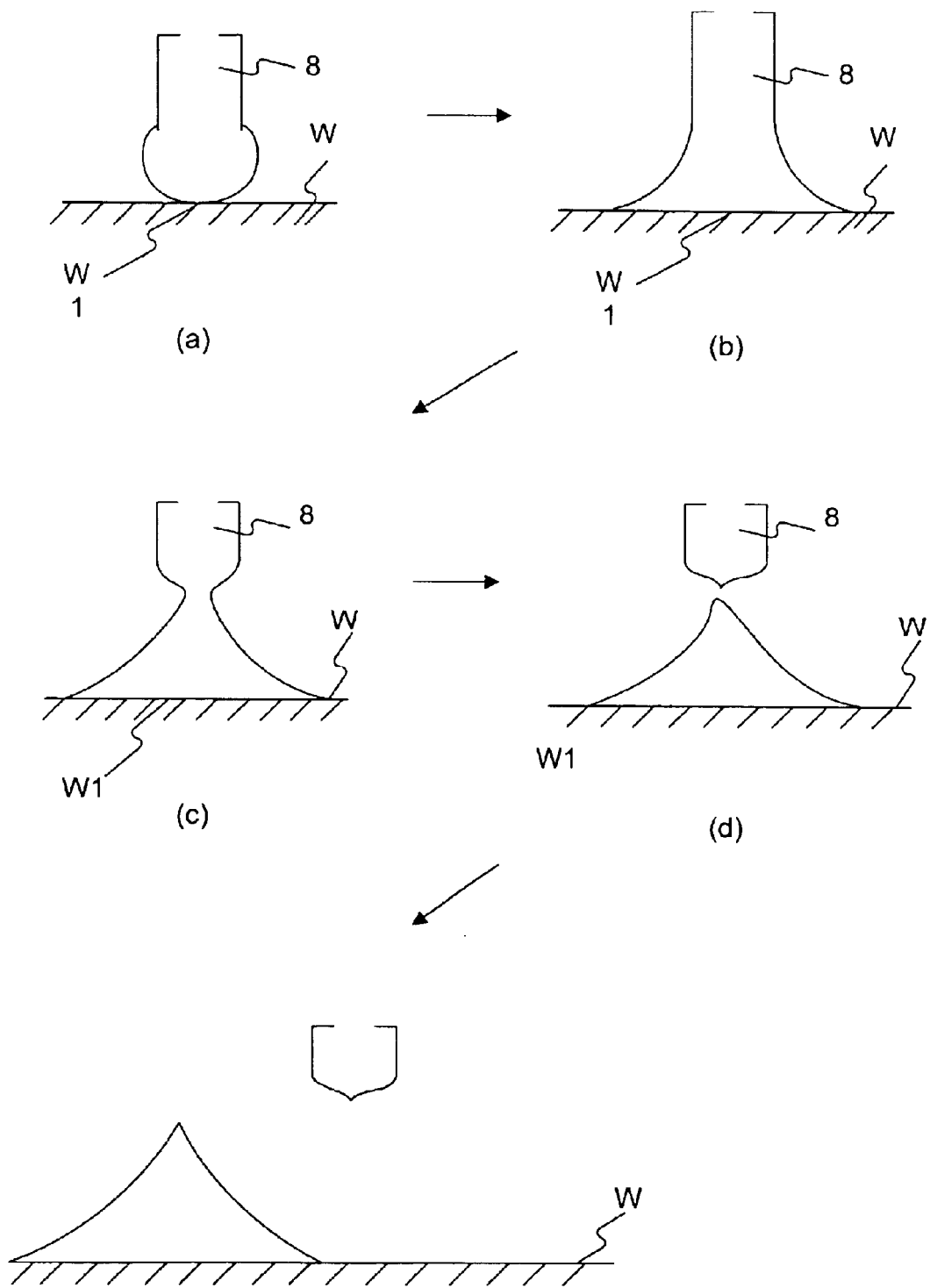
FIG. 7 illustrates a welding procedure by the gas-metal arc welding device.

Referring to FIG. 7, a detailed description will be given of the state at the time of the above-described welding. First, as illustrated in FIG. 7(a), when the welding wire 8 is brought into contact with a portion W1 to be welded of the work W, the current flows between the welding wire 8 and the work W by the power source 5.

If this state proceeds, the welding wire 8 undergoes necking, as illustrated in FIG. 7(c), and finally, the welding wire 8 is cut out to be separated from the work W, as illustrated in FIG. 7(d). In this manner, the portion W1 to be welded is subjected to the welding by the tip of the fixingly welded welding wire 8. Here, the tip of the welding wire 8 separated from the work W is disposed above a next portion W2 to be welded on the work W, as illustrated in FIG. 7(e) since the carrier 2 gradually moves away in FIG. 1.

In the above-described series of welding procedures, the voltage value and current value of the current flowing between the welding wire 8 and the work W are started to be measured from the beginning of the contact between the welding wire 8 and the work W in accordance with the program (step S9). Here, the voltage value is measured by converting the voltage value in the voltage measuring circuit 16 into a digital signal by the A/D converter 14 for the voltage, and further, the current value is measured by converting the current value of the current flowing in the current measuring circuit 19 into a digital signal by the A/D converter 15 for the current.

Next, in step S10, an electric resistance R between the welding wire 8 and the work W is calculated based on the measured voltage and current values. In step S11, the calculated electric resistance R is stored, and further, in step S12, the electric resistance R is differentiated with a time. In next step S13, it is judged whether or not the differential value of the electric resistance R becomes 0 or more (i.e., a positive value). If the result in step S13 is judged to be "No", the control routine returns to step S9 in accordance with the program, and thereafter, the control routine from step S9 to step S13 is repeated until the result in step S13 is judged to be "Yes". During such repeated operation, the electric resistance R between the welding wire 8 and the work W is continuously measured, and finally, the latest electric resistance R is stored in step S11.

Figure 8:
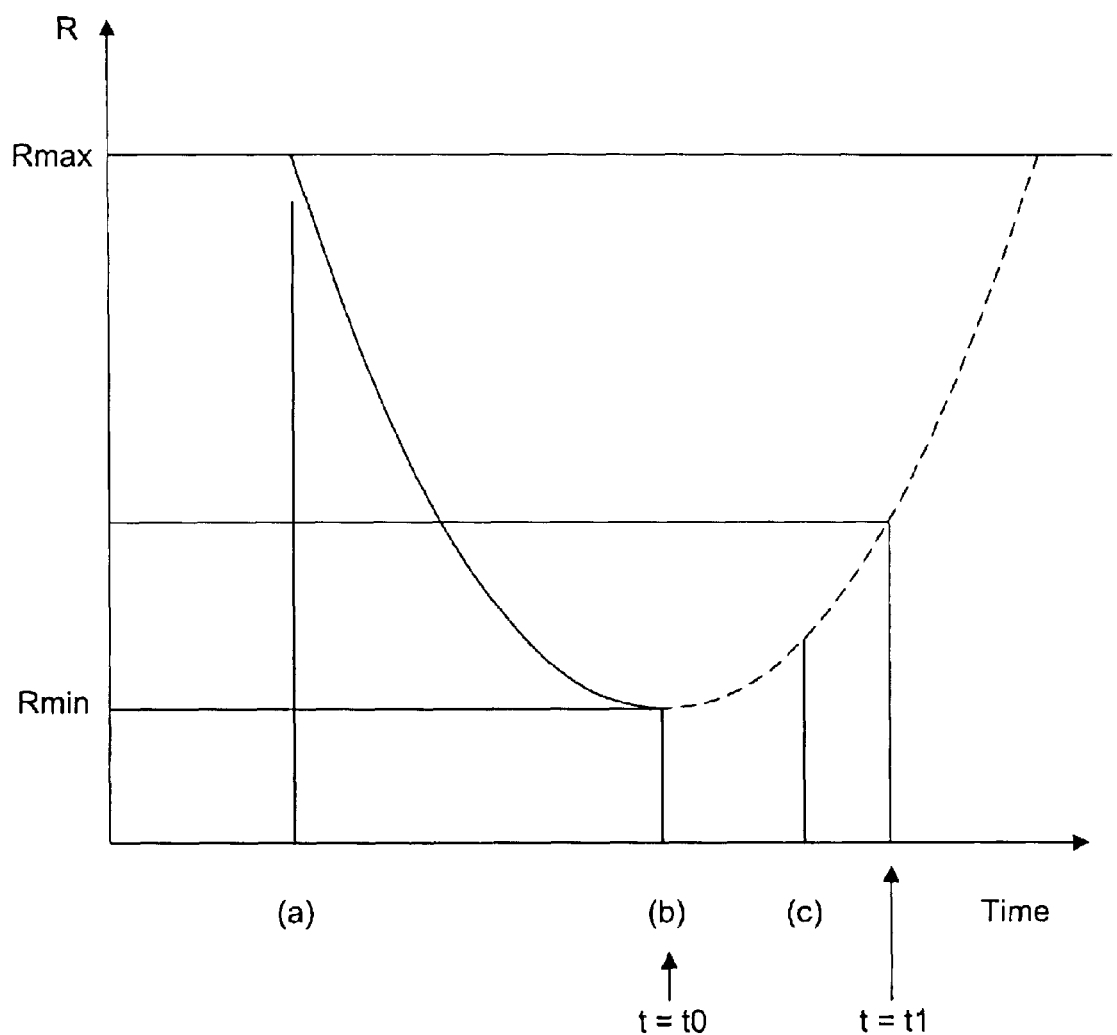
FIG. 8 is a graph illustrating variations of an electric resistance between a welding wire and a work in the welding procedure.

Now, explanation will be made on variations of the electric resistance R. As illustrated in FIG. 8, the electric resistance R gradually becomes smaller after the beginning of the contact between the welding wire 8 and the work W (that is, the time of the state illustrated in FIG. 7(a)), and it becomes smallest at the time when the welding wire 8 is melted without any necking and brought into contact with the work W at the greatest contact area (that is, the time of the state illustrated in FIG. 7(b)). When the welding wire 8 is started to undergo the necking (for example, the time of the state illustrated in FIG. 7(c)), the electric resistance R is gradually increased up to a maximum Rmax immediately before the tip of the welding wire 8 is separated from the work W. Consequently, the result in step S13 is judged to be "Yes" at the time when the electric resistance R transits from a decrease to an increase, i.e., at the time of a minimum Rmin of the electric resistance R. The minimum Rmin is stored in the RAM 11 in step S11.

In next step S14, a time (t) when the result in step S13 is judged to be "Yes" is set to 0 by an inside timer contained in the controller 7. In other words, when the electric resistance R is decreased down to the minimum Rmin, the time (t) is set to 0. Subsequently, in step S15, it is judged whether or not a lapse of time after the time W is set to 0 reaches a time t1. Here, the elapsed time t1 is assumed to be, for example, a time required for an increase in electric resistance R from the minimum Rmin by an electric resistance of 10% or more and 98% or less, preferably, 50% or more and 97% or less, more preferably, 75% or more and 95% or less of a difference between the minimum Rmin and the maximum Rmax (see FIG. 8). The elapsed time t1 is normally about 0.5 ms after the time at the minimum Rmm. Incidentally, the maximum Rmax signifies an electric resistance immediately before the welding wire 8 is separated from the work W, as described above, i.e., immediately before the electric resistance R becomes very high (corresponding to resistance of the arc), and it may be experimentally determined in advance to be stored in the controller 7.

If the result in step S15 is judged to be "Yes", the current is reduced. Consequently, the tip of the welding wire 8 can be prevented from bursting when the welding wire 8 is separated from the work W (that is, in the state illustrated in FIG. 7(d)). As a result, molten particles from the welding wire 8 are hardly expelled over the work W, so that spatters are hardly generated. Even if the current is reduced as described above, the tip of the welding wire 8 is being molten by residual heat, and therefore, it can be naturally separated from the work W as the work W is moved by the carrier 2.

Subsequently, in step S17, it is judged whether or not the time t is further elapsed by α, that is, whether or not the time t becomes t+α. Here, α is normally about 0.25 ms. If the result in step S17 is judged to be "Yes", the control routine proceeds to step S18 in accordance with the program, and then, the power source 5 will increase the current again. In this manner, the voltage is applied again between the welding wire 8 and the work W, which then come into a weldable state.

In next step S19, a correction value L required for achieving the optimum distance D between the torch 3 and the work W is calculated based on a mathematical equation (1) below in accordance with the program. In the mathematical equation (1), Rmin represents the above-described minimum of the electric resistance R stored in step S11, and C and S represent the material constant and cross-sectional area of the welding wire 8, respectively, stored in step S3.

$$L = \frac{R\min S}{C} \qquad (1)$$

In step S20, the correction value L obtained in step S19 is subtracted firom the optimum distance D stored in step S5, thereby calculating a difference X. In next step S21, it is judged whether or not the difference X is 0. If the result in step S21 is judged to be "Yes", a distance between the tip of the welding wire 8 and the next portion W2 to be welded of the work W has already become the optimum distance D in FIG. 7(e). Therefore, the control routine returns to step S7 in accordance with the program, and then, the welding operation in step S7 onward is repeated with respect to the portion W2 to be welded.

In contrast, if the result in step S21 is judged to be "No", the control routine proceeds to step S22 in accordance with the program, and then, it is judged whether or not the difference X is greater than 0. If the result in step S22 is judged to be "Yes", the control routine proceeds to step S23 in accordance with the program, and then, the motor 9 is rotated reversely. In consequence, the torch 3 is moved upward in FIG. 1. In next step S24, it is judged whether or not the torch 3 is moved by a quantity equivalent to the difference X. In judging, the movement quantity may be replaced by an operating quantity of the motor 9.

When the movement quantity of the torch 3 reaches the quantity equivalent to the difference X, the control routine proceeds from step S24 to step S25 in accordance with the program, and then, the motor 9 is stopped. As a result, the distance between the welding torch 3 and the next portion W2 to be welded of the work W (see FIG. 7(e)) is set to the optimum distance D. After the control in step S25 comes to an end, the control routine returns to step S7 in accordance with the program. The welding operation in step S7 onward is repeated with respect to the portion W2 to be welded.

If the result in step S22 is judged to be "No", the control routine proceeds to step S26 in accordance with the program, and then, the motor 9 is rotated forward. In consequence, the torch 3 is moved downward in FIG. 1. In next step S27, it is judged whether or not the torch 3 is moved by a quantity equivalent to an absolute value of the difference X. In judging, the movement quantity may be replaced by the operating quantity of the motor 9.

When the movement quantity of the torch 3 reaches the quantity equivalent to the absolute value of the difference X, the control routine proceeds from step S27 to step S28 in accordance with the program, and then, the motor 9 is stopped. As a result, the distance between the welding torch 3 and the next portion W2 to be welded of the work W (see FIG. 7(e)) is set to the optimum distance D. After the control in step S28 comes to an end, the control routine returns to step S7 in accordance with the program. The welding operation in step S7 onward is repeated with respect to the portion W2 to be welded.

As described above, since in the present embodiment, the power source 5 temporarily reduces the welding current in step S16, the liquid part of the welding wire 8 hardly bursts when it is separated from the work W, and as a result, the spatters are hardly generated on the work W. Consequently, the welding excellent in the finished quality can be achieved at a low cost, unlike in the conventional arc welding method.

Furthermore, in the present embodiment, the correction value L is calculated based on the minimum Rmin of the electric resistance R during the contact between the welding wire 8 and the work W, and accordingly, the torch 3 is moved in such a manner as to achieve the optimum distance D between the torch 3 and the portion to be welded on the work W. Here, the electric resistance R can be obtained in the more stable state in comparison with the voltage or current value during the contact between the welding wire 8 and the work W, thereby obtaining the minimum Rmin with accuracy. Consequently, the torch 3 can be precisely moved in the vertical direction in such a manner as to provide the optimum distance D between the torch and the workpiece during the welding operation.

Incidentally, although in the above-described embodiment, the elapsed time t1 to be judged in step S25 is set as described above, the present invention is not limited to this. The elapsed time t1 may be arbitrarily set within the range of the time required after the minimum Rmin of the electric resistance R is detected until the time immediately before the welding wire 8 is separated from the work W (that is, the time when the necking of the welding wire 8 is sufficiently generated).

Additionally, although in the above-described embodiment, the timing when the current is temporarily reduced is determined based on the elapsed time (e.g., the above-described elapsed time t1) after the time when the minimum Rmin is detected, this timing may be determined based on another criterion. For example, the measurement (calculation) of the electric resistance R between the welding wire 8 and the work W is continued also after the minimum Rmin is detected, and then, the current may be temporarily reduced as soon as the electric resistance R is increased up to a predetermined value, i.e., a predetermined value between the minimum Rmin and the maximum Rmax experimentally determined and stored in advance.

The predetermined electric resistance described here should be normally an electric resistance obtained by adding the electric resistance of 10% or more and 98% or less, preferably, 50% or more and 97% or less, more preferably, 75% or more and 95% or less of the difference between the minimum Rmin and the maximum Rmax to the minimum Rmin. If the current is temporarily reduced before the electric resistance reaches the predetermined value, it becomes possibly difficult that the welding wire 8 is smoothly separated from the work W, resulting in a danger of degradation of the finished quality of the welding, although the generation of the spatters can be suppressed.

Figure 9:
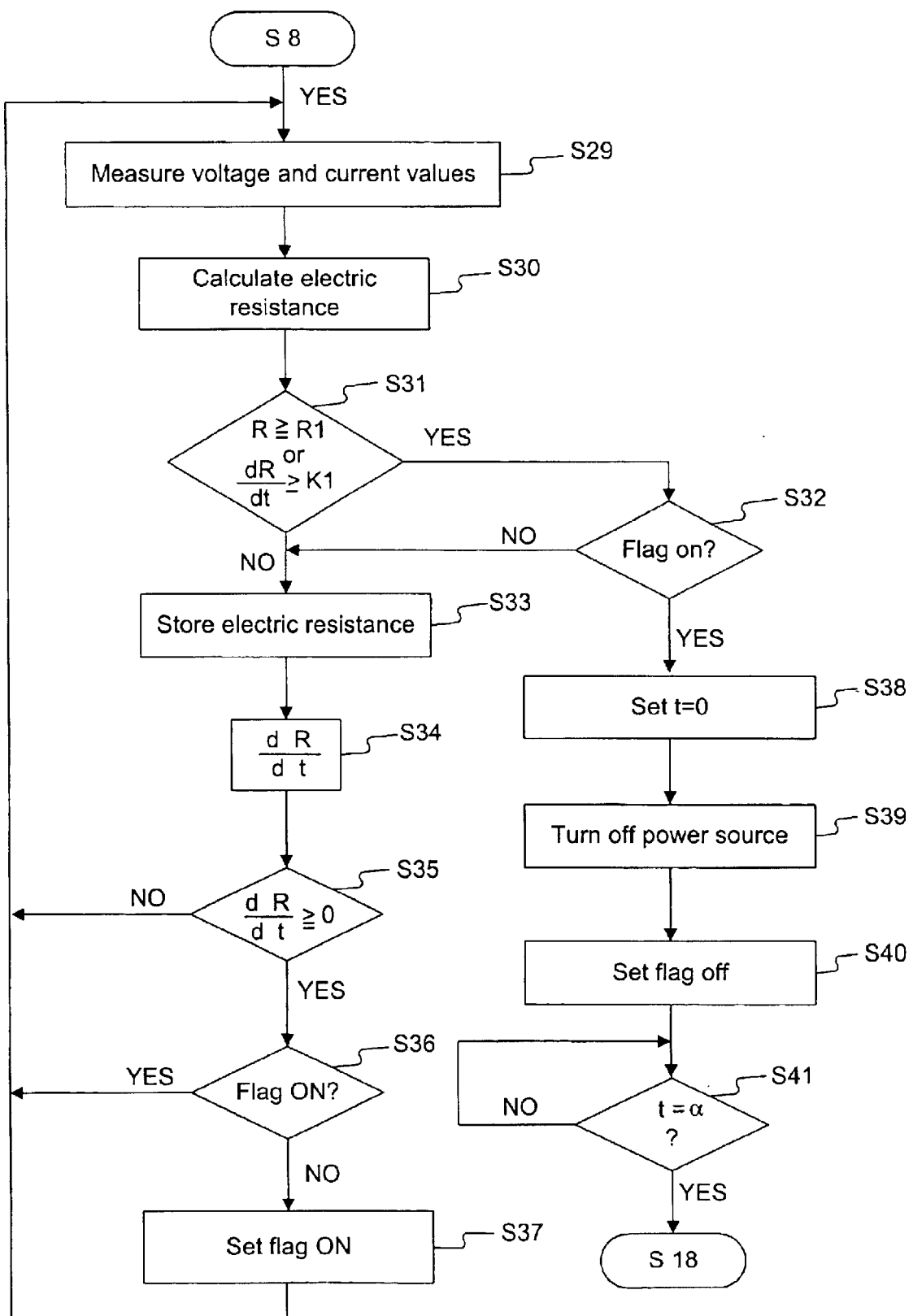
FIG. 9 is part of a flowchart illustrating the control of a gas-metal arc welding device in a modification according to the present invention.

Referring, to FIG. 9, explanation will be specifically made on operation in the case where the current is temporarily reduced with the criterion of the above-described predetermined electric resistance. In this modification, part of the control flowchart in the above-described embodiment, that is, the control routine from step S8 to step S18 is modified to step S29 to step S41 as illustrated in FIG. 9. The operation in the modification will be explained hereafter in reference to FIG. 9. Here, the controller 7 previously stores therein the above-described predetermined electric resistance (hereinafter referred to as "an electric resistance R1").

In the same manner as in the above-described embodiment, the control routine reaches step S8 in accordance with the program. In step S8, upon confirmation of the electric conduction between the welding wire 8 and the work W, the voltage and current values of the current flowing between the welding wire 8 and the work W are started to be measured in next step S29. Here, the voltage and current values are measured in a manner similar to the above-described embodiment.

Next, in step S30, the electric resistance R between the welding wire 8 and the work W is calculated based on the measured voltage and current values. In next step S31, it is judged whether or not the calculated electric resistance R is the predetermined electric resistance R1 or higher. If the electric resistance R exceeds the predetermined electric resistance R1, the control routine proceeds to step S32 in accordance with the program, and then, it is judged whether or not a specific flag inside the CPU 10 is ON. Unless the flag is ON, the electric resistance R calculated in step S30 is stored in accordance with the program (step S33). Furthermore, in step S34, the electric resistance R is differentiated with a time. In next step S35, it is judged whether or not the differential value of the electric resistance R is 0 or more (i.e., a positive value). If the result in step S35 is Judged to be "No", the control routine returns to step S29 in accordance with the program, and thereafter, the control routine from step S29 to step S35 is repeated until the result in step S35 is judged to be "Yes". During such repeated operation, the electric resistance R between the welding wire 8 and the work W is continuously calculated, and finally, the latest electric resistance R is stored in step S33. Incidentally, the electric resistance R is varied in the same manner as that in the above-described embodiment.

If the result in step S35 is judged to be "Yes", that is, if the minimum Rmin of the electric resistance R is detected (the minimum-Rmin is recorded in RAM 11 in step S33, and further, is independently stored in the RAM 11 for the prevention of erasure), the control routine proceeds to step S36 in accordance with the program, and then, it is judged whether or not the above-described specific flag is ON. If the flag is ON, the control routine returns to step S29 in accordance with the program, and thus, the control routine from step 29 to S36 is repeated. In contrast, unless the flag is ON, the specific flag inside the CPU 10 (this is the flag to be judged in step S32 and S36) is set ON in step S37 in accordance with the program, and thereafter, the control routine returns to step S29.

In this series of operations, the electric resistance R is increased up to the above-described predetermined electric resistance R1 through the minimum Rmin, the result in step S32 is judged to be "Yes" in accordance with the program, and then, the control routine proceeds to step S38. In step S38, a time (t) at that time is set to 0 by the inside timer in the controller 7. Subsequently, in step S39, the current is reduced. Consequently, the tip of the welding wire 8 can be prevented from bursting when the welding wire 8 is separated from the work W (that is, in the state illustrated in FIG. 7(d)). As a result, molten particles from the welding wire 8 are hardly expelled over the work W, so that spatters are hardly generated. Even if the the current is reduced as described above, the tip of the welding wire 8 is being molten by residual heat, and therefore, it can be naturally separated from the work W as the work W is moved by the carrier 2.

After step S39, the above-described specific flag is set to OFF in step S40 in accordance with the program, and subsequently, the inside timer is set to 0 in step S38. Thereafter, it is judged in step S41 whether or not a time a is elapsed, that is, whether or not the time t becomes a. Here, a is normally about 0.25 ms. If the result in step S41 is judged to be "Yes", the control routine proceeds to step S18 in the same manner as in the above-described embodiment, and then, the current is increased again. Thereafter, the same operation as that in the above-described embodiment is performed.

The present invention may be carried out in other various forms without departing from the spirit or essential features thereof. The above-described embodiment is, therefore, to be considered as being merely illustrative and not restrictive in all respects. The scope of the present invention is shown by the appended claims rather than restricted by the description of the specification. Furthermore, all modifications or changes which come within the range of equivalency of the claims are intended to be encompassed in the present invention.

Additionally, instead of comparison $R \geq R1$ in step S31, another condition can be set $dR/dt \geq K1$, where K1 is a predetermined value of the time derivative of the resistance. This condition means that the current is reduced as soon as the time derivative of the resistance is increased up to a predetermined value K1, defined experimentally and stored in advance in S30. The whole algorithm in FIG. 9 with this change in step S31 will be valid without this change.

Additionally, modifications of the present invention are intended to be the special cases, when the current is kept constant until the events for current reduction are not detected. Under this condition, it is enough to measure the voltage only, and detection conditions ($dR/dt \geq 0$, $R \geq R1$ or $dR/dt \geq K1$) are reduced to conditions ($dU/dt \geq 0$, $U \geq U1$ or $dU/dt \geq L1$), where U1 and L1 are experimentally predetermined values of voltage and time derivative of the voltage respectively.

What is claimed is:

1. An arc welding method for subjecting a work to welding by the use of a welding wire, the arc welding method comprising the steps of:
   bringing the welding wire into contact with the work while applying a voltage between the welding wire and the work, thereby causing the end of the welding wire to be fixingly welded to the work;
   obtaining an electric resistance between the welding wire and the work during the contact between the welding wire and the work, so as to detect a minimum of the electric resistance; and
   temporarily reducing the current flowing through the wire after the detection of the minimum of the electric resistance and after a predetermined amount of time has elapsed after detection of the minimum of the electric resistance.

2. The arc welding method according to claim 1, wherein a voltage value and a current value between the welding wire and the work are measured, and thus, the electric resistance between the welding wire and the work is obtained based on the volatage value and the current value.

3. The arc welding method according to claim 1, wherein the predetermined time is a time required such that the electric resistance between the welding wire and the work reaches an electric resistance obtained by adding to the minimum an electric resistance of 10% or more and 98% or less of a difference between the minimum and a previously obtained maximum of the electric resistance between the welding wire and the work.

4. The arc welding method according to claim 1, wherein the predetermined time is equal to or more than 0.5 ms.

5. The arc welding method according to claim 1, wherein the current is temporarily reduced during a time of about 0.25 ms.

6. The arc welding method according to claim 1, further comprising determining a torch-to-workpiece distance correction value based on the detected minimum of the electric resistance.

7. The arc welding method according to claim 6, further comprising:
   adding the torch-to-workpiece distance correction value to a previously determined torch-to-workpiece distance value to obtain an optimum torch-to-workpiece distance, and
   adjusting a distance between the welding wire and the work to the optimum torch-to-workpiece distance.

8. An arc welding device for subjecting a work to welding by the use of a welding wire, the arc welding device comprising:

means for applying a voltage between the welding wire and the work;

means for moving the welding wire in such a manner as to bring the welding wire into contact with the work;

means for obtaining an electric resistance between the welding wire and the work during the contact between the welding wire and the work, so as to detect a minimum of the electric resistance; and means for temporarily reducing the current after the detection of the minimum of the electric resistance and after a predetermined amount of time has elapsed after detection of the minimum of the electric resistance.

9. An arc welding method for subjecting a work to welding by the use of a welding wire, the arc welding method comprising the steps of:

bringing the welding wire into contact with the work while applying a voltage between the welding wire and the work, thereby causing the end of the welding wire to be fixingly welded to the work;

obtaining an electric resistance between the welding wire and the work during the contact between the welding wire and the work;

detecting a minimum of the electric resistance;

storing a value corresponding to the minimum of the electric resistance; and temporarily reducing the current flowing through the wire after detecting the minimum of the electric resistance and when the electric resistance reaches a level equal to the stored value plus a resistance offset value.

10. The arc welding method of claim 9, wherein the resistance offset value is determined by adding to the minimum of the electric resistance a value equal to about 10% to about 98% of a difference between the minimum of the electric resistance and a previously obtained maximum of the electric resistance between the welding wire and the work.

11. The arc welding method of claim 10, wherein the resistance offset value is determined by adding to the minimum of the electric resistance a value equal to about 50% to about 97% of a difference between the minimum of the electric resistance and a previously obtained maximum of the electric resistance between the welding wire and the work.

12. The arc welding method of claim 11, wherein the resistance offset value is determined by adding to the minimum of the electric resistance a value equal to about 75% to about 95% of a difference between the minimum of the electric resistance and a previously obtained maximum of the electric resistance between the welding wire and the work.

* * * * *